Patented July 8, 1947

2,423,572

UNITED STATES PATENT OFFICE 2,423,572

NAPHTHOLSULFONAMIDOBENZALDEHYDES AND ACETALS THEREOF

David W. Woodward, Wilmington, Del., assignor to E. I. du Pont de Nemours & Company, Wilmington, Del., a corporation of Delaware No Drawing. Application May 3, 1946, Serial No. 667,111

4 Claims. (Cl. 260—338)

This invention relates to new hydroxy- and acyloxy - aromatic sulfonamidoaldehydes and lower acetals thereof. More particularly, it relates to 1-hydroxy- and 1-acyloxynaphthalene sulfonamidobenzaldehydes and their acetals with lower monohydric and dihydric alcohols.

An object of this invention is to provide a new class of 1-hydroxy- and 1-acyloxynaphthalene sulfonamidoaldehydes and lower acetals thereof. A related object is to provide such aldehydes as dye intermediates. Another object is to provide such aldehydes as intermediates for the preparation of polymeric dye intermediates. A further object is to provide practical procedures for making such aldehydes. Still other objects will be apparent from the following detailed description of the invention.

The novel 1-hydroxy- and 1-acyloxynaphthalene sulfonamidobenzaldehydes of this invention may be represented by the general formula:

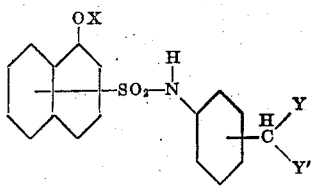

wherein X is hydrogen or an acyl radical, Y and Y' are together oxygen or the residue

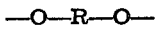

—O—R—O—

(R being the divalent hydrocarbon radical attached to the oxygen atoms) of a glycol of 2 to 3 carbon atoms, e. g., ethylene glycol, 1,3-propylene glycol, 1,2-propylene glycol, and 1,3-butylene glycol, and separately an alkoxy group of 1 to 4 carbon atoms. In the above formula one of the positions ortho or para to the hydroxyl group is unsubstituted or contains a group replaceable in dye coupling reactions, such as a halogen atom, e. g., Cl or Br or an acid group, e. g., COOH, SO₃H. The remaining positions in the aromatic rings may be substituted with any substituents which do not interfere with azo dye coupling or color coupling development reactions contained in color formers, e. g., alkyl, aryl, alkoxy, aryloxy, halogen, nitro, amino, acylamino, sulfonic acid, carboxylic acid, sulfonamide, trifluoromethyl, or beta-hydroxyethyl groups. The acyl radicals can readily be hydrolyzed to hydroxyl groups by warming in aqueous alkaline or acid solutions. Thus stirring in 50/50 alcohol-water solution containing 2% sodium carbonate at 90° C. will completely hydrolyze the acyloxy group in one hour or less. Another convenient method consists in heating the compounds for 5 to 60 minutes in the presence of aqueous ammonia or sodium hydroxide at temperatures of 50° to 90° C.

The above compounds can advantageously be prepared from available 1-naphthol sulfonic acids by converting them to the corresponding sulfonyl chlorides by reaction with phosphorus trichloride, phosphorus oxychloride, or phosphorus pentachloride or mixtures thereof. Before this conversion is effected, however, the hydroxy group is preferably protected by acylation, for example, with an acylating agent such as acetyl chloride, acetic anhydride, ethyl chlorocarbonate, benzoyl chloride, p-toluenesulfonyl chloride, etc. The naphthol sulfonic- or acyloxynaphthalene sulfonic acid chlorides are then condensed with amino benzaldehydes or simple acetals thereof, i. e., dimethyl, diethyl, ethylene glycol, etc. acetals, in a liquid medium in the presence of a basic agent capable of removing or neutralizing the hydrogen chloride formed. Suitable acid neutralizing agents that can be used are alkali metal carbonates, acetates, hydroxides, phosphates, or organic bases, such as pyridine, trialkylamines, triethanolamine, etc. Suitable liquid media include dioxane, water, water-dioxane, ether, acetone, acetone-water, dimethylformamide, etc. Of course, it is possible to use sulfonic acid halides other than the chlorides, e. g., the corresponding bromides, but, in general, the chlorides are of most use.

Although compounds having the above general formula may be prepared from any of the isomeric 1-naphthol acids, i. e., when the sulfonic acid group is in the 2, 3, 4, 5, 6, 7, or 8 position, the preferred compounds hereof are those prepared from ortho-isomers, that is, from 1-naphthol-2-sulfonic acid.

These new sulfonamidoaldehydes and acetals may be condensed with polyvinyl alcohols or hydrolyzed interpolymers of vinyl esters with other vinyl monomers to form polyacetals according to the methods of United States Patent 2,310,943, or by any other suitable modification thereof. Thus the color-forming aldehyde and polyvinyl alcohol are stirred together in suspension or solution in an organic or aqueous organic solvent system containing a catalytic amount of a strong acid, e. g., phosphoric, sulfuric, hydrochloric, formic, chloroacetic, etc.

The 2-sulfonamidobenzaldehyde derivatives are preferred since the polyvinyl acetals prepared therefrom yield, on color development, blue-green dyes superior in color transmission and absorption, i. e., they approach more closely the theoretical requirement of a minus red dye, than do the isomeric compounds. In addition, the dyes produced from the ortho isomers are of greater stability to light and storage than previously known polyvinyl acetal color formers.

The invention will be further illustrated but it is not intended to be limited by the following examples in which the parts are by weight unless otherwise stated.

Example I

Into a reactor equipped with an agitator, thermometer, and ice bath is charged a solution of 310 parts of anhydrous potassium carbonate in 570 parts of water, 200 parts of dioxane, and 380 parts of m-aminobenzaldehyde ethylene glycol acetal. The mixture is stirred at 0° C. while adding during two hours a hot solution of 630 parts of 1-acetoxy-2-naphthalene sulfonyl chloride (for preparation see Anschutz, Ann. 415, 92 (1918)) in 900 parts of dioxane. The mixture is stirred while warming to 25° C. during four hours, then diluted to 4000 parts with ice water, stirred while cooling to 5° C. and filtered. On drying, 800 parts of a white solid product are obtained. Pure m-(1-acetoxy-2-naphthalene sulfonamido)-benzaldehyde ethylene glycol acetal of the following structure:

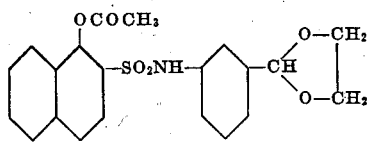

having a melting point of 138°–140° C. is obtained by crystallizing from benzene or alcohol. Analysis: Percent calculated for $C_{21}H_{19}O_6NS$— C=61.0; H=4.6; S=4.7. Per cent found— C=61.5; H=5.0; S=4.7.

The above crude compound is dissolved in an equal weight of acetone and stirred for one hour at 25° C. with 10% hydrochloric acid equivalent to 50% of the weight of the acetone. A crystalline product separates during this time and is filtered and washed with water. After recrystallizing from three times its weight of 70% acetone, pure m-(1-acetoxy-2-naphthalene sulfonamido)benzaldehyde of the following structure is obtained:

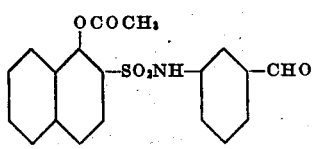

This material melts at 170° to 171° C. and on analysis is found to have the following percentage composition: C=62.2; H=4.06; N=3.50; S=8.43; as compared with a calculated value of C=61.8; H=4.06; N=3.8; and S=8.7.

Example II

A solution of 285 parts of 1-acetoxy-2-naphthalene sulfonyl chloride in 400 parts of dioxane is added with stirring to a mixture of 40 parts of sodium hydroxide, 360 parts of water, 167 parts of m-aminobenzaldehyde dimethyl acetal and 100 parts of dioxane at 0° C. The mixture is stirred while warming to 25° C., stirred three hours, then saturated with carbon dioxide and diluted with water to 3000 parts. The oily layer which separates is stirred with 100 parts of acetone to crystallize and filtered at 5° C. After recrystallizing from acetone, a white crystalline product melting at 166° to 168° C. is obtained. This material is identical with the m-(1-acetoxy-2-naphthalenesulfonamido)benzaldehyde prepared as above in Example I.

In place of the specific naphthol acid chlorides in Examples I and II, there can be used other such acid chlorides. Useful additional compounds include the following:

1-ethylcarbonato-2-naphthalene sulfonyl chloride
1-benzoxy-2-naphthalene sulfonyl chloride
1-acetoxy-3-naphthalene sulfonyl chloride
1-acetoxy-5-naphthalene sulfonyl chloride
1-acetoxy-4-chloro-2-naphthalene sulfonyl chloride
1-acetoxy-4-chloro-6-naphthalene sulfonyl chloride
1-acetoxy-2,4-dichloro-6-naphthalene sulfonyl chloride
1-acetoxy-2-chloro-7-naphthalene sulfonyl chloride
1 - acetoxy - 2 - methyl - 7 - naphthalene sulfonyl chloride
1 - acetoxy - 2 - (N - phenyl)naphthamido - 5-sulfonyl chloride
1-acetoxy-4-chloro-2-naphthalene sulfonyl chloride
1-acetoxy-8-chloro-2-naphthalene sulfonyl chloride In place of the m-aminobenzaldehyde ethylene glycol acetal of Example I, other aminobenzaldehydes or their dialkyl or lower glycol acetals may be employed to prepare useful products according to the present invention. Additional suitable compounds of this type include:

o-Aminobenzaldehyde
p-Aminobenzaldehyde
2-chloro-3-aminobenzaldehyde
4-chloro-3-aminobenzaldehyde
4-methyl-3-aminobenzaldehyde
2- or 3-amino-6-formylbenzoic acid
3-amino-2-formyl benzene sulfonic acid
5-amino-2-formyl benzene sulfonamide
and the acetals thereof.

The conditions of the reactions are not limited to those described in the above examples. In general, the condensation can be carried out at temperatures between −10° C. and 100° C., although the range of 0° C. to 30° C. is the most practical.

These new 1-hydroxynaphthalene and 1-acyloxynaphthalene sulfonamidobenzaldehydes are also useful in preparing dyes for application to textiles, fibres, filaments, and films. These dyes retain the reactive function and can thus react with the film or fiber substrate to produce fast-to-washing dyed articles. Substrates such as cellulosic fibers, e. g., cotton, viscose yarn, etc., protein fibers, e. g., wool, silk, casein fibers, etc., containing hydroxyl, amino, or amide groups are most readily capable of condensation with the aldehyde group.

Polyvinyl acetals prepared from these new aldehydes are of value in other color photographic processes where it is desired to have a 1-naphthol dye intermediate structure, such as in the azo process of United States Patents 2,297,732; 2,342,620; 2,220,929; and 2,339,213. They are also of value in the textile dyeing process where polymeric dye intermediates are admixed with the fiber-forming material before spinning. Treatment of the fiber with a diazotized amine forms a dye of high wash fastness.

As mentioned previously the quinone-imine dyes formed by color-coupling development of silver halide in the presence of the 2-sulfonamides of this invention possess outstanding spectral absorption characteristics which make them suitable for use as minus-red components in three-color photography. In addition to this fact, the dyes possess remarkable light-fastness as compared to the usual color-developed dye. It will be appreciated that in color photographic processes the presence of stains and impurities is to be avoided rigorously. The present compounds have been found to be admirably suited for the preparation of stain-free brilliant color photographs by the procedure of Jennings, Murray, and White United States application Serial No. 528,942, and it is believed that one reason for this is the fact that they can be prepared in a high state of purity before carrying out the final polymer-forming acetalization reaction with polyvinyl alcohol. In addition to these advantages, the compounds can be prepared in good yield from available, economical, commercial intermediates thus lending themselves to a commercially practical procedure.

As many widely different embodiments of this invention can be made without departing from the spirit and scope thereof, it is to be understood that the invention is not to be limited except as defined by the appended claims.

What is claimed is:

1. A compound taken from the group consisting of aldehydes of the general formula:

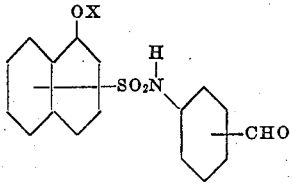

wherein X is a member taken from the group consisting of hydrogen and acylradicals, and acetals thereof with a hydroxy compound taken from the group consisting of alkanols of 1 to 4 carbon atoms and 1,2- and 1,3-alkanediols of 2 to 4 carbon atoms.

2. The compound of the formula

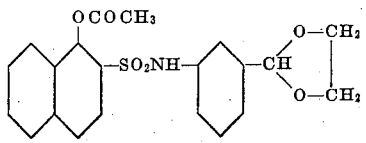

3. The compound of the formula

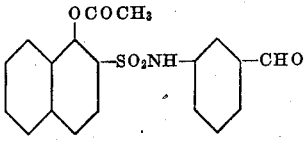

4. Meta-(1-hydroxy - 2 - naphthalene-sulfonamido)benzaldehyde.

DAVID W. WOODWARD.

REFERENCES CITED

The following references are of record in the file of this patent:

UNITED STATES PATENTS

| Number | Name | Date |
| --- | --- | --- |
| 1,876,955 | Kalischer et al. | Sept. 13, 1932 |
| 2,310,943 | Dorough | Feb. 16, 1943 |